(12) United States Patent
Murphy

(10) Patent No.: US 11,017,419 B2
(45) Date of Patent: May 25, 2021

(54) SYSTEMS AND METHODS FOR MANAGING INCENTIVE CAMPAIGNS AND AUTOMATICALLY APPROVING REQUESTS FOR INCENTIVES

(71) Applicant: SCILICET, LLC, Duluth, GA (US)

(72) Inventor: Thomas Patrick Murphy, Suwanee, GA (US)

(73) Assignee: Scilicet, LLC, Duluth, GA (US)

( * ) Notice: Subject to any disclaimer, the term of this patent is extended or adjusted under 35 U.S.C. 154(b) by 0 days.

(21) Appl. No.: 16/559,850

(22) Filed: Sep. 4, 2019

(65) Prior Publication Data
US 2021/0065228 A1    Mar. 4, 2021

(51) Int. Cl.
*G06Q 30/02* (2012.01)
*G06N 20/00* (2019.01)

(52) U.S. Cl.
CPC ......... *G06Q 30/0211* (2013.01); *G06N 20/00* (2019.01); *G06Q 30/0219* (2013.01)

(58) Field of Classification Search
CPC . G06Q 30/0211; G06Q 30/0219; G06N 20/00
See application file for complete search history.

(56) References Cited

U.S. PATENT DOCUMENTS

| 7,668,747 B2 | 2/2010 | Murphy | |
|---|---|---|---|
| 8,200,532 B2 | 6/2012 | Murphy | |
| 2010/0153198 A1* | 6/2010 | Murphy | G06Q 30/02 705/14.15 |
| 2018/0218420 A1* | 8/2018 | Cotton | G06Q 30/0224 |

OTHER PUBLICATIONS

Merkourios Karaliopoulos, et al. "First learn then earn: optimizing mobile crowdsensing campaigns through data-driven user profiling." In Proceedings MobiHoc '16. Association for Computing Machinery, New York, NY, USA, 271-280. DOI:https://doi.org/10.1145/2942358.2942369. (Year: 2016).*

* cited by examiner

*Primary Examiner* — Katherine Kolosowski-Gager
(74) *Attorney, Agent, or Firm* — Miller & Martin PLLC

(57) ABSTRACT

Systems and methods to manage incentive campaigns and automatically approve requests for incentives received from consumers or their proxy based on dynamic parameters defined by an incentive provider are described herein. Users at various levels between an original equipment manufacturer and the consumer may interact and offer input. In various implementations, campaign parameters may be received from an incentive provider and used to initiate and/or otherwise administrate a campaign. Incentive providers may then dynamically modify ongoing campaigns via the system. One or more user interfaces may be generated through which users may interact with the system and visualizations related to a campaign may be presented. Based on the initial or modified parameters for a campaign, the systems and methods described herein may further determine whether to approve, deny, or otherwise respond to requests for incentives received from consumers or their proxy.

30 Claims, 5 Drawing Sheets

SYSTEMS AND METHODS FOR MANAGING INCENTIVE CAMPAIGNS AND AUTOMATICALLY APPROVING REQUESTS FOR INCENTIVES

FIELD OF THE INVENTION

The present invention relates to managing incentive campaigns and automatically approving requests for incentives received from consumers or their proxy based on dynamic parameters defined by an incentive provider.

BACKGROUND OF THE INVENTION

Automobile and other manufacturers often offer rebates or other incentives to stimulate purchasers to buy certain products during an offer period. They also offer rebates in an attempt to "fine-tune" the price of the product to achieve market equilibrium. Various problems and drawbacks exist with rebate programs and the methods by which they are implemented. For example, conventional rebate programs typically offer static incentives. Static incentives are perfectly inefficient because they do not permit visibility into the sales funnel and are typically over inclusive or under inclusive with respect to the group of likely potential buyers. This leads to market inefficiencies—over-incenting leads to lower profit margins, and under-incenting leads to excess inventory. Other drawbacks include the lead time necessary to implement a rebate program, the lack of meaningful information about potential purchasers and what would prompt them to buy at any given time, and the inability to effectively target individual or specific groups of purchasers, among other drawbacks.

SUMMARY OF THE INVENTION

Various embodiments of the present disclosure may include systems, methods, and non-transitory computer readable media configured to manage incentive campaigns and automatically approve requests for incentives received from consumers or their proxy based on dynamic parameters defined by an incentive provider. The system may enable users at various levels between an original equipment manufacturer and the consumer to interact and offer input, thereby providing the system with the immediate visibility and intelligence necessary to maximize the effectiveness of an incentive campaign. For example, users may comprise original equipment manufacturers, other corporate entities, retailers (such as a dealership or its representatives), the consumers themselves, and/or other entities that may be involved in a given transaction.

According to one aspect of the present invention, the system described herein may initiate and manage a campaign for an incentive provider. A campaign may comprise an incentive (or rebate) program offered by an incentive provider either indefinitely or over a defined time period. An incentive provider may comprise an original equipment manufacturer, another corporate entity, a retailer, or other entity providing one or more incentives via a campaign related to one or more items. In some implementations, incentive providers for a campaign may include multiple entities, a multi-level organization, or multiple multi-level organizations. In various implementations, the system may receive, from an incentive provider, campaign parameters and use the campaign parameters to initiate and/or otherwise administrate a campaign. For example, the campaign parameters may define incentives that may be made available to consumers during a campaign, one or more rules governing the provision of incentives available to consumers during a campaign, an incentive cap defining the maximum amount for any given incentive, an incentive budget associated with the campaign, an expiration date associated with the campaign, a sale volume cap or other constraints associated with the campaign (e.g., vehicle type, consumer agreements, deposit amount, retailer segment, geography, or budget), and/or a campaign target parameter (i.e., a sales target or volume goal). In some implementations, incentive providers may specify (e.g., by providing user input via a user interface specifying one or more campaign parameters as described herein) which incentives are available to be provided during a campaign and one or more rules that govern whether those incentives are available to be provided to a consumer in conjunction with other incentives and in what circumstances. In various implementations, the system may be configured to manage information associated with a campaign, generate and transmit messages to consumers, manage incentive surplus, and/or otherwise manage campaigns for incentive providers based on the campaign parameters provided by the incentive providers.

In various implementations, the system may be configured to generate and provide one or more user interfaces through which users (i.e., original equipment manufacturer(s), other corporate entity(s), retailer(s), consumer(s), or other users) may interact with the system. Through a user interface, the system may present visualizations associated with a given campaign. For example, the system may be configured to utilize information associated with one or more campaigns (e.g., campaign information, sale information, incentive request information, and/or other information associated with one or more campaigns) to generate, update, or otherwise maintain one or more visualizations. The visualizations may enable the incentive provider and/or other users to track the success of a campaign and assist the incentive provider in making decisions related to a campaign. For example, the visualizations may enable a user to view live consumer demand for a particular incentive, view the performance of an incentive campaign (e.g., based on revenue generated or items sold), compare the performance of multiple campaigns, view the projected impact of a change to an incentive cap, view a chart of the actual incentive spend versus the planned incentive spend over a period of time, or view a forecast of the actual incentive spend by the incentive provider.

In various implementations, the system described herein may facilitate the dynamic modification of an ongoing campaign. In various implementations, modifications to a campaign may be made in response to requests to modify the campaign received from an incentive provider. Requests to modify a campaign may include a request to modify a campaign parameter used to initiate and/or otherwise administrate a campaign. For example, an incentive provider may request to modify the incentive cap for a given campaign after the campaign has been initiated. The incentive cap may define the maximum incentive amount that may be offered for any single item or set of items associated with a campaign. In some implementations, the system may be configured to automatically determine suggested modifications to a campaign and cause an indication of the suggested modification to be provided to the incentive provider. For example, suggested modifications may be identified based on information defining sales already made during the campaign and a campaign target parameter indicating a sales target or a volume goal for the campaign. The suggested modification may comprise a suggestion to move available funds for incentives associated with the campaign to another campaign, a suggestion to modify an expiration date associated with the campaign, a suggestion to modify the incentive cap, and/or one or more other modifications to the campaign (or at least one of the campaign parameters).

According to another aspect of the present invention, the system described herein may facilitate the automatic approval of requests for incentives received from consumers or their proxy based on the dynamic parameters defined by an incentive provider. For example, the system may be configured to receive, from a consumer or their proxy, a request for a desired incentive amount related to at least one item associated with a given campaign. The system may be configured to automatically approve or deny requests received based on one or more factors. For example, the system may determine whether to approve or deny the request by determining whether the desired incentive amount exceeds an incentive cap associated with the campaign. In various implementations, a notification may be provided to the consumer or their proxy indicating that the request for the desired incentive amount is approved or denied without further input from the incentive provider. In the event the request for the desired incentive amount is denied, a counteroffer incentive amount up to or less than the modified incentive cap may be determined and a notification indicating the determined counteroffer incentive amount may be provided to the consumer or their proxy. For example, the notification indicating the determined counteroffer incentive amount may be provided with a notification that the request for the desired incentive amount has been denied. In some instances, a request for a desired incentive amount may be received after an incentive cap has been modified and the system may determine whether to approve or deny the request by determining whether the desired incentive amount exceeds a modified incentive cap.

For each request received, incentive request information associated with the request that includes an indication of the desired incentive amount requested and whether the given request was approved or denied may be stored. In the event a request for a desired incentive amount is received and automatically denied, the incentive request information may be reconsidered responsive to the later modification of the incentive cap. For example, responsive to the modification of an incentive cap for a campaign, whether the desired incentive amounts for previously denied requests no longer exceed the modified incentive cap may be determined based on the incentive request information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

The invention described herein relates to systems and methods for managing incentive campaigns and automatically approving requests for incentives received from consumers or their proxy based on dynamic parameters defined by an incentive provider. The systems and methods described herein may enable users at various levels between an original equipment manufacturer and the consumer to interact and offer input, thereby providing the system with the immediate visibility and intelligence necessary to maximize the effectiveness of an incentive campaign. In various implementations, campaign parameters may be received from an incentive provider and used to initiate and/or otherwise administrate a campaign. Incentive providers may then dynamically modify ongoing campaigns via the system. One or more user interfaces may be generated through which users may interact with the system and visualizations related to a campaign may be presented. Based on the initial or modified parameters for a campaign, the systems and methods described herein may further determine whether to approve, deny, or otherwise respond to requests for incentives received from consumers or their proxy.

It will be appreciated by those having skill in the art that the implementations described herein may be practiced without these specific details or with an equivalent arrangement. In various instances, well-known structures and devices are shown in block diagram form to avoid unnecessarily obscuring the implementations.

Example System Architecture

Figure 1:
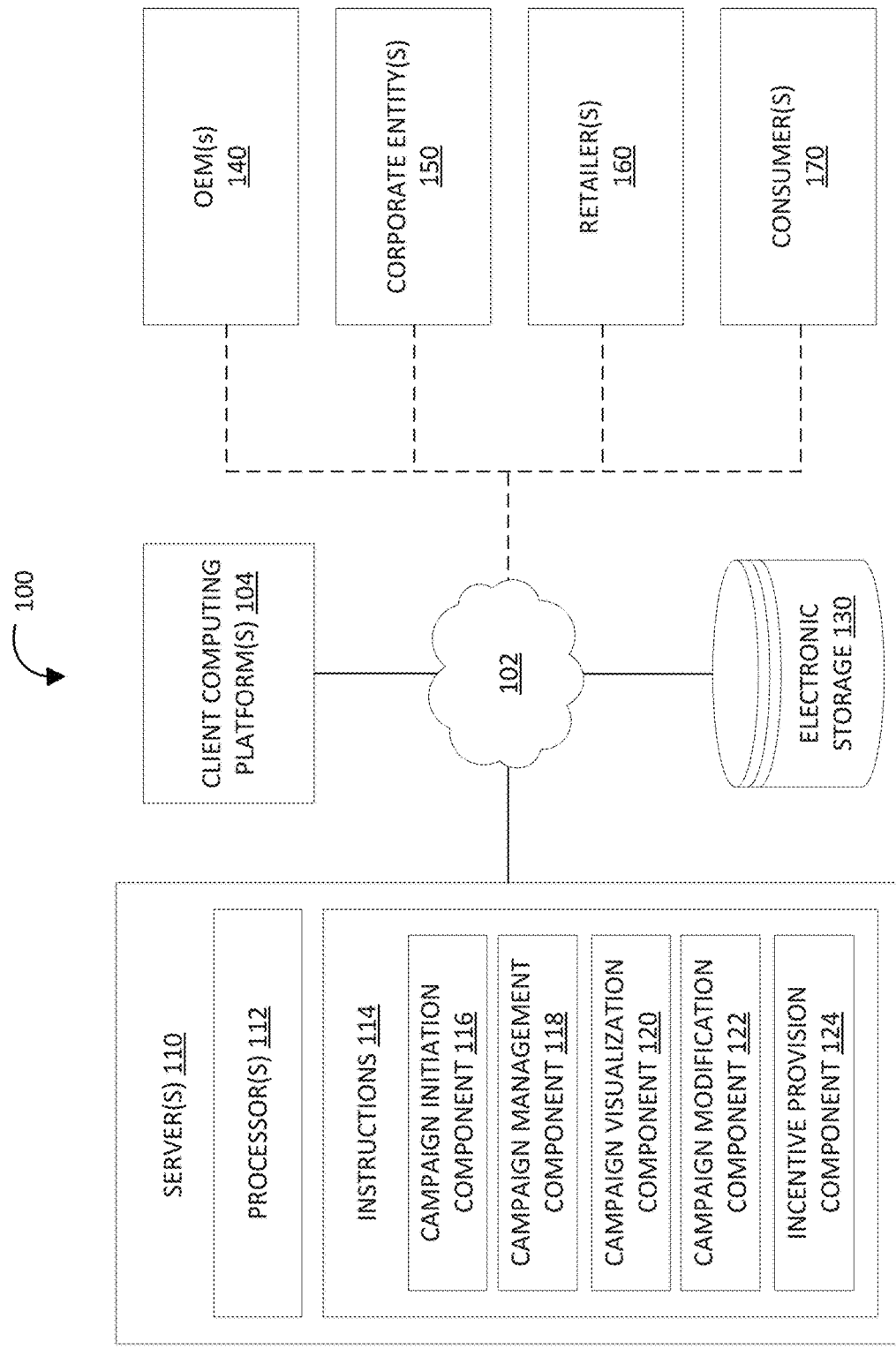
FIG. 1 illustrates a block diagram of an example of a system for managing incentive campaigns and automatically approving requests for incentives received from consumers or their proxy based on dynamic parameters defined by an incentive provider, according to an implementation of the invention.

FIG. 1 illustrates a block diagram of an example of a system 100 for managing incentive campaigns and automatically approving requests for incentives received from consumers or their proxy based on dynamic parameters defined by an incentive provider, according to an implementation of the invention. In various implementations, system 100 may include one or more client computing platforms 104, one or more servers 110, electronic storage 130, and/or other components. For example, system 100 may include one or more external resources, such as sources of information outside of system 100, external entities participating with system 100, and/or other resources. In various implementations, system 100 may be configured to receive input from or otherwise interact with one or more original equipment manufacturers 140, one or more corporate entities 150, one or more retailers 160, and/or one or more consumers 170. For example, one or more original equipment manufacturers 140, one or more corporate entities 150, one or more retailers 160, one or more consumers 170, and/or their representatives may interact with system 100 via one or more client computing platforms 104.

A given client computing platform 104 may include one or more processors configured to execute computer program components. The computer program components may be configured to enable an incentive provider (i.e., an original equipment manufacturer, another corporate entity, a retailer, and/or other entity providing one or more incentives related to one or more items via a campaign) to initiate, modify, monitor, and/or otherwise manage a campaign, enable one or more users (e.g., one or more original equipment manufacturers 140, one or more corporate entities 150, one or more retailers 160, one or more consumers 170, and/or their representatives/proxy) to request desired incentives and/or otherwise interact with the incentive provider via system 100, and/or otherwise facilitate the user interaction(s) associated with the operations described herein. By way of non-limiting example, a given client computing platform may include one or more of a desktop computer, a laptop computer, a handheld computer, a tablet computing platform, a NetBook, a Smartphone, and/or other computing platforms.

In various implementations, one or more servers 110 (also interchangeably referred to herein as server(s) 110, server 110, or servers 110 for convenience) may be configured to communicate with one or more client computing platforms 104 and/or other components of system 100. Users may access system 100 via client computing platform(s) 104. As used herein, "user" or "users" may include one or more original equipment manufacturers 140, one or more corporate entities 150, one or more retailers 160, one or more consumers 170, and/or their representatives/proxy. The server(s) 110 may provide the client computing platform(s) 104 with information necessary to present user interfaces on the client computing platform(s) 104. The client computing platform(s) 104 may communicate information back to server(s) 110 in order to facilitate further processing and/or functionality at server(s) 110. Communications may be facilitated through network(s) 102. The network(s) 102 may include wired and/or wireless connections. The network(s) 102 may include the Internet, Bluetooth, USB, and/or other communication networks. It will be appreciated that this is not intended to be limiting and that the scope of this disclosure includes implementations in which components of system 100 may be operatively linked via some other communication media.

In various implementations, server(s) 110 may include one or more physical processors 112 and/or other components. The one or more physical processors 112 (also interchangeably referred to herein as processor(s) 112, processor 112, or processors 112 for convenience) may be configured to provide information processing capabilities in system 100. As such, the processor(s) 112 may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

In various implementations, processor(s) 112 may be configured to execute one or more computer readable instructions 114. Executing the computer readable instructions 114 may cause one or more processors 112 to manage incentive campaigns and automatically approve requests for incentives received from consumers or their proxy based on dynamic parameters defined by an incentive provider. Computer readable instructions 114 may include one or more computer program components. In some implementations, computer readable instructions 114 may be stored in electronic storage (e.g., electronic storage 130). Computer readable instructions 114 may include one or more of campaign initiation component 116, campaign management component 118, campaign visualization component 120, campaign modification component 122, incentive provision component 124, and/or other computer program components. As used herein, for convenience, the various computer readable instructions 114 will be described as performing an operation, when, in fact, the various instructions program the processor(s) 112 (and therefore system 100) to perform the operation.

Campaign initiation component 116 may be configured to initiate a campaign related to one or more items for an incentive provider. A campaign may comprise an incentive (or rebate) program offered by an incentive provider either indefinitely or over a defined time period. An incentive provider may comprise an original equipment manufacturer, another corporate entity, a retailer, and/or other entity providing one or more incentives related to one or more items via a campaign. In some implementations, incentive providers for a campaign may include multiple entities, a multi-level organization, or multiple multi-level organizations. In various implementations, campaign initiation component 116 may be configured to initiate a campaign based on campaign parameters. In various implementations, the campaign parameters may define the available incentives for the one or more items, one or more rules governing the provision of incentives available to consumers during a campaign, an incentive cap defining the maximum amount for any given incentive, an incentive budget associated with the campaign, an expiration date associated with the campaign, a sale volume cap and/or other constraints associated with the campaign (e.g., vehicle type, consumer agreements, deposit amount, retailer segment, geography, budget, and/or other constraints), a campaign target parameter (i.e., a sales target, a volume goal, and/or other campaign target), and/or other aspects of the campaign. Campaign parameters may be used to initiate and/or otherwise administrate a campaign. Each campaign parameter may or may not be known to one or more users of system 100. In various implementations, campaign initiation component 116 may be configured to receive campaign parameters from an incentive provider. For example, campaign initiation component 116 may be configured to receive, from an incentive provider, campaign parameters that define at least the incentives that may be made available to consumers during (or through) the campaign.

In various implementations, campaign initiation component 116 may be configured to determine an incentive cap defining the maximum amount for any given incentive, or set of incentives, available to a consumer during a particular campaign. As described further herein, incentive providers may, within system 100, specify (e.g., by providing user input via a user interface specifying one or more campaign parameters) which incentives are available to be provided during a campaign and one or more rules that govern whether those incentives are available to be provided to a consumer in conjunction with other incentives, and in what circumstances. In various implementations, campaign initiation component 116 may be configured to determine an incentive cap based on the set of incentives available during a given campaign. For example, based on the one or more rules that govern whether specific incentives are available to be provided to a consumer in conjunction with other incentives, campaign initiation component 116 may be configured to determine the maximum incentive amount that may be provided based on a single incentive cap or by combining multiple mutually tolerant qualifying incentives. In an example implementation, a campaign may be associated with multiple incentives that include a $1,000 incentive that is tolerant of everything and a $700 incentive that is tolerant except for two incentives each worth $300. Accordingly, the largest available collective incentive is two incentives worth $1,700 (i.e., $1,000+$700) or three incentives worth $1,600 (i.e., $1,000+$300+$300). In the foregoing example implementation, campaign initiation component 116 may be configured to determine that the incentive cap for that campaign is $1,700—the greatest possible collective incentive based on the available incentives for that campaign and the rules that govern whether those incentives are available to be provided in conjunction with other incentives, and in what circumstances. Accordingly, campaign initiation component 116 may be configured to optimize the incentive cap for a campaign based on the incentives available for that campaign.

Campaign management component 118 may be configured to manage campaigns for incentive providers. For example, campaign management component 118 may be configured to manage requests to modify a campaign or requests for incentives from a consumer or their proxy, manage information associated with a campaign, generate and transmit messages to one or more consumers 170 (e.g., via client computing platform(s) 104), manage incentive surplus, and/or otherwise manage campaigns for incentive providers. In various implementations, campaign management component 118 may be configured to generate user interfaces through which users (i.e., original equipment manufacturer(s) 140, other corporate entity(s) 150, retailer(s) 160, consumer(s) 170, and/or other users) interact with system 100. In various implementations, campaign management component 118 may be configured to cause information necessary to present the generated user interfaces to be provided to client computing platform(s) 104 to facilitate presentation of the generated user interfaces to one or more users.

In various implementations, campaign management component 118 may be configured to receive requests to modify a campaign. For example, campaign management component 118 may be configured to receive, from an incentive provider (e.g., an original equipment manufacturer 140, another corporate entity 150, a retailer 160, and/or other incentive provider), requests to modify a campaign offered by that incentive provider. In various implementations, campaign management component 118 may be configured to cause requests to modify a campaign to be provided to campaign modification component 122, which is configured to modify a campaign as described further herein.

In various implementations, campaign management component 118 may be configured to receive requests for incentives from a consumer or their proxy. In various implementations, a request for a desired incentive amount received may include an indication of a desired incentive amount, one or more items associated with the request, and/or other information associated with the request. For example, the other information associated with the request may include additional information related to the purchase. For example, the request may include the particular item to be purchased, the type of item to be purchased, a deposit amount to be paid by the consumer and/or other financing information, and/or other information related to the request and/or the potential purchase for which the incentive amount is being requested.

In some implementations, the other information associated with the request may include answers to additional questions posed to the consumer in connection with the request. In various implementations, an incentive provider may include one or more questions for a consumer or their proxy to answer and provide with a request for a desired incentive amount. The one or more questions may relate to an age of the consumer, a demographic, whether the consumer is or was a member of the military, whether the consumer recently graduated or will graduate shortly (e.g., the graduation month and/or year, the degree received, the school from which the degree was obtained, and/or other questions related to receipt of a college degree), one or more other items the consumer is interested in (e.g., in the case of car buying, one or more other makes or models of car the consumer is also interested in), what other stores the consumer has done business with, how long does incentive need to be available or valid, and/or other topics that may be relevant for determining an incentive available to the consumer or may otherwise comprise useful information to the incentive provider. The additional questions may comprise questions of one or more varying types. For example, the additional questions may include questions with binary answers (yes or no), question requesting the consumer (or their proxy) to specify a range, multiple choice questions, and/or other types of questions that provide additional information to the incentive providers regarding the consumer requesting the incentive.

As described herein, incentive provision component 124 may be configured to determine whether to accept or deny a request for a desired incentive amount based on the information accompanying a request. In various implementations, campaign management component 118 may be configured to cause individual requests for incentives received from a consumer or their proxy to be provided to incentive provision component 124, which is configured to automatically determine whether to approve or deny the request as described further herein.

In various implementations, campaign management component 118 may be configured to track, store a record of, and/or otherwise manage campaign information, sale information, incentive request information, and/or other information associated with a campaign. Campaign information may include information associated with the administration of a campaign offered by an incentive provider. For example, campaign information may comprise the campaign parameters utilized to initiate the campaign, requests to modify a campaign received from an incentive provider, suggested modifications to a campaign, modifications made to a campaign, and/or other information associated with the administration of a campaign. Sale information may include information associated with individual sales of one or more items associated with a campaign. For example, sale information may comprise a sale price, purchaser information (including name, address, phone number, email address, and/or other contact information), incentives offered and/or utilized, date and/or time of purchase, and/or other information associated with sales of the one or more items associated with the campaign. Incentive request information may include information associated with requests received by system 100 from a consumer or their proxy. For example, incentive request information may comprise an indication of the desired incentive amount requested, whether the given request was approved or denied, whether the request resulted in a sale, request information received with the request (e.g., answers to additional questions posed to the consumer in connection with the request), and/or other information associated with requests for incentives received by system 100. In various implementations, campaign management component 118 may be configured to cause campaign information, sale information, incentive request information, and/or other information associated with a campaign to be provided to one or more other components of system 100 to facilitate one or more processing operations described herein with respect to the one or more other components.

In various implementations, campaign management component 118 may be configured to generate messages to be provided to one or more consumers 170 based on stored incentive request information comprising information associated with one or more previously denied requests for incentives received from the one or more consumers 170. For example, as described further herein, a request for a desired incentive amount that was previously denied may be reconsidered in response to one or more modifications to the campaign parameters. In an example implementation, campaign management component 118 may be configured to receive, from a consumer or their proxy, a request for a desired incentive amount related to at least one item associated with a campaign. If the received request is denied, the request may be subsequently reconsidered responsive to the modification of one or more campaign parameters for the campaign to determine whether the request would now be approved, as described herein with respect to incentive provision component 124. In various implementations, campaign management component 118 may be configured to generate and transmit a message to a consumer (e.g., consumer 170) responsive to a determination that the desired incentive amount of the previously denied request would now be approved (e.g., because the desired incentive amount does not exceed a modified incentive cap). In other words, system 110 may be configured to engage in narrowcasting by generating and transmitting targeted messages to consumers who submitted a request for a desired incentive amount that was previously denied but would now be approved based on one or more changes to the incentive campaign.

In various implementations, campaign management component 118 may be configured to manage incentive surplus. For example, through system 100, an incentive provider may be able to provide users (i.e., corporate entities, retailers, and/or other entities utilizing system 100 to request incentive amounts on behalf of a consumer) with the incentive surplus created by the user requiring an incentive amount less than the incentive cap to make a sale. In order to create an incentive surplus, the user (e.g., a retailer such as a dealership) would need to use less than the per-item (e.g., per vehicle) budgeted incentive (or incentive cap), which may or may not be known to the user. If the user closes a deal without using any incentive, the entire budgeted per-item incentive amount may be "banked" by the user for later use. For example, if the incentive cap for a given item or incentive during a campaign is $3,000 and the user submits two requests for an incentive amount of $1,000 that are both approved and result in a sale, a surplus of $4,000 (i.e., ($3,000-$1,000)×2) is created by the user wisely distributing incentives less than the maximum to execute the deal. In some implementations, campaign management component 118 may be configured to facilitate access to all or a portion of the surplus created by a user for use in subsequent sales. For example, a consumer may subsequently request an incentive of $5,000 for a given transaction. This request may be denied if the incentive cap is set at $3,000. However, the user (e.g., the retailer) may utilize a portion of the surplus created in previous sales to incent the consumer to make the purchase. For example, the user may utilize $2,000 of the $4,000 surplus created to increase the incentive amount offered to the consumer to $5,000 in order to make the sale. Use of the surplus may be at the user's discretion, enabling the user (e.g., a retailer such as a dealership) to, for example, utilize the surplus on items they know they have been unable to sell and not use it on items of high demand. Accordingly, system 100 may enable an incentive provider to encourage retailers or other entities through which an item is to be purchased to wisely utilize the available incentive cap in order to maximize sales. In some implementations, the incentive surplus generated per sale may be based on an incentive provider-controlled split percentage point. For example, an incentive provider may dictate how much gets shared with the user (i.e., the corporate entity or retailer) and entered into surplus and how much is allocated back to the incentive provider. If the retailer banks part of the unused incentive and the incentive provider banks the remainder, the incentive provider may have the flexibility to redistribute their retained part of the surplus where it may otherwise be needed (e.g., to another campaign in the same region or in a different region entirely).

In various implementations, campaign management component 118 may be configured to evaluate users based on their interaction with system 100. For example, for a given campaign, campaign management component 118 may be configured to evaluate (e.g., grade or rate) a given corporate entity or retailer through which items are to be purchased in association with the campaign. In some implementations, campaign management component 118 may be configured to evaluate, per user, how much they request, how often they make requests, how many of their requests get approved or denied, and/or otherwise evaluate user interaction with system 100 for one or more campaigns. In some implementations, campaign management component 118 may be configured to quantify the effect of the grade. For example, based on the evaluation of each user, campaign management component 118 may be configured to reduce number of incentives that are approved for users performing below a certain level, publicly indicate how each user is graded (e.g., post a leaderboard indicating the ranking of the users based on a predetermined metric), reward users that perform at a predefined level, and/or otherwise encourage or discourage user behavior based on the evaluation of each user. In some implementations, campaign management component 118 may be configured to evaluate users based on their interaction with system 100, generate messages based on the evaluation, and transmit the messages to the user (e.g., via one or more computing platform(s) 140).

Campaign visualization component 120 may be configured to generate one or more visualizations associated with a given campaign. In various implementations, visualizations generated by campaign visualization component 120 may be displayed via a display device. For example, visualizations generated by campaign visualization component 120 may be displayed via a display device of a client computing platform 104. In various implementations, campaign visualization component 120 may be configured to utilize information associated with one or more campaigns (e.g., campaign information, sale information, incentive request information, and/or other information associated with one or more campaigns) to generate one or more visualizations. In some implementations, campaign visualization component 120 may be configured to receive information associated with one or more campaigns from campaign management component 118.

In various implementations, campaign visualization component 120 may be configured to generate and provide visualizations to one or more users that track the success (or progress) of a campaign, assist a user (e.g., an incentive provider) in making decisions related to a campaign (e.g., dynamically adjusting an incentive cap), and/or otherwise display information available to the system related to one or more campaigns. For example, campaign visualization component 120 may be configured to generate and provide visualizations that enable a user to view live consumer demand for a particular incentive, view the performance of an incentive campaign (e.g., based on revenue generated or items sold), compare the performance of multiple campaigns, view the projected impact of a change to an incentive cap, view a chart of the actual incentive spend versus the planned incentive spend over a period of time, view a forecast of the actual incentive spend by the incentive provider, and/or otherwise visualize the information available to system 100.

Figure 2:
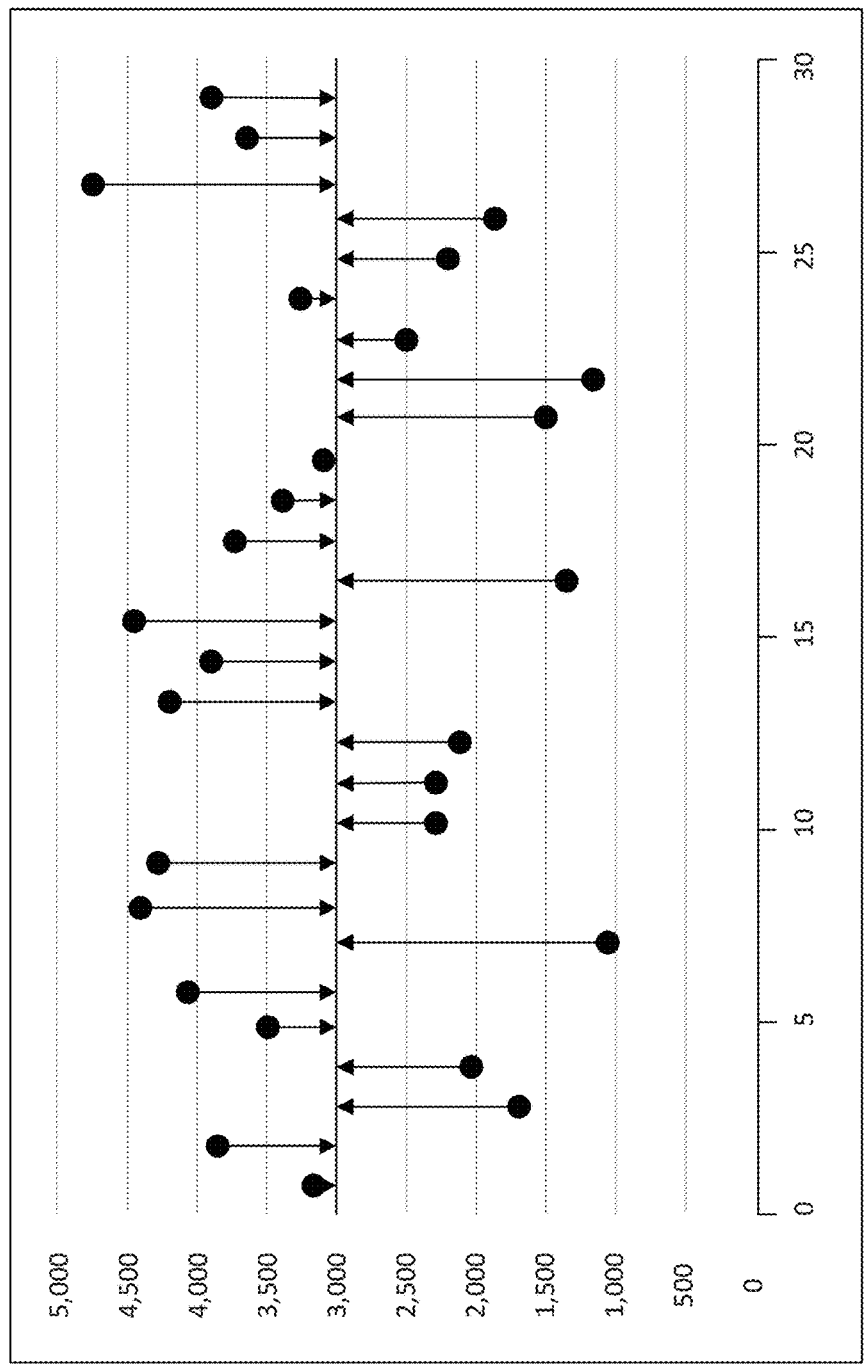
FIG. 2 illustrates an example visualization related to a given campaign generated based on information available to the system, in accordance with one or more implementations.

FIG. 2 depicts an example visualization 200 related to a given campaign generated based on information available to system 100, in accordance with one or more implementations. Example visualization 200 depicts sales made during a given campaign, indicating (on the y-axis) the incentive amount required to incent a consumer (e.g., one or more consumers 170) to make the purchase. In various implementations, campaign visualization component 120 may be configured to generate example visualization 200. Example visualization 200 also illustrates the technical improvement over conventional systems embodied by the systems and methods described herein.

As described above, various problems and drawbacks exist with conventional rebate programs and the methods by which they are implemented. For example, conventional rebate programs typically offer static incentives. A campaign (or rebate program) offering static incentives will offer the same incentive to each consumer, regardless of whether the consumer would have made a purchase with a smaller incentive or whether the incentive is unable to incent the consumer to make a purchase. Accordingly, the campaign may be both over inclusive (by providing incentives to consumers who would not need them to make the purchase) and under inclusive (by failing to capture sales missed due to the incentive not large enough). For example, example visualization 200 depicts 29 transactions (or possible transactions). In a conventional rebate program wherein a static $3,000 incentive is made available to consumers, the 29 possible transactions would only result in 13 transactions. For example, the $3,000 incentive would be insufficient to induce 16 consumers to purchase, the $3,000 incentive would have exceeded the incentive needed to induce 12 consumers to purchase, and for only one consumer would the $3,000 incentive been the exact incentive amount needed to induce a purchase.

Unlike conventional rebate programs, the systems and methods described herein enable an incentive provider to utilize dynamic incentives to limit incentives provided to consumers to only what is needed to incent the sale, thereby freeing up the profits that would otherwise be lost (by providing a greater incentive that is necessary) to be applied to sales that would otherwise be missed (i.e., because the static incentive amount was not great enough to incent the sale). For example, as described further herein, an incentive provider may establish an incentive cap for a campaign that is unknown to consumers (e.g., one or more consumers 170), their proxy, or other entities through which the incentives are provided. The system may receive requests for an incentive amount and determine automatically whether to accept or deny the request based on the incentive cap and/or one or more other parameters, as described further herein with respect to incentive provision component 124.

Referring back to FIG. 1, campaign visualization component 120 may further be configured to provide one or more visualizations associated with a given campaign. For example, campaign visualization component 120 may be configured to generate example visualization 300 illustrated in FIG. 3, example visualization 410 of example interface 400 illustrated in FIG. 4, example visualization 420 of example interface 400 illustrated in FIG. 4, and/or one or more other visualizations generated based on information available to system 100. Example visualization 300, example visualization 410 of example interface 400, and example visualization 420 of example interface 400 are described further herein with respect to FIG. 3 and FIG. 4

In various implementations, campaign visualization component 120 may be configured to update visualizations generated for a given campaign. For example, campaign visualization component 120 may be configured to automatically update visualizations over time (e.g., during the pendency of the campaign) based on information available to system 100. For example, campaign visualization component 120 may be configured to obtain an indication of a projected incentive spend for a campaign and the current actual incentive spend at a given point during the campaign. The indication of a projected incentive spend for a campaign and the current actual incentive spend may be obtained from campaign management component 118. For example, campaign management component 118 may be configured to determine the current actual incentive spend for a campaign (e.g., based at least on one or more approved requests for incentives). In various implementations, campaign visualization component 120 may be configured to generate a visualization depicting both the projected incentive spend and the actual incentive spend and cause the visualization to be provided via a graphical user interface. In various implementations, an incentive provider may provide user input indicating potential changes to the incentive cap and campaign visualization component 120 may be configured to update the visualization to indicate the projected incentive spend based on the potential change to the incentive cap. As such, an incentive provider may visualize, in real-time, how changes to the incentive cap may affect the campaign itself.

Figure 3:
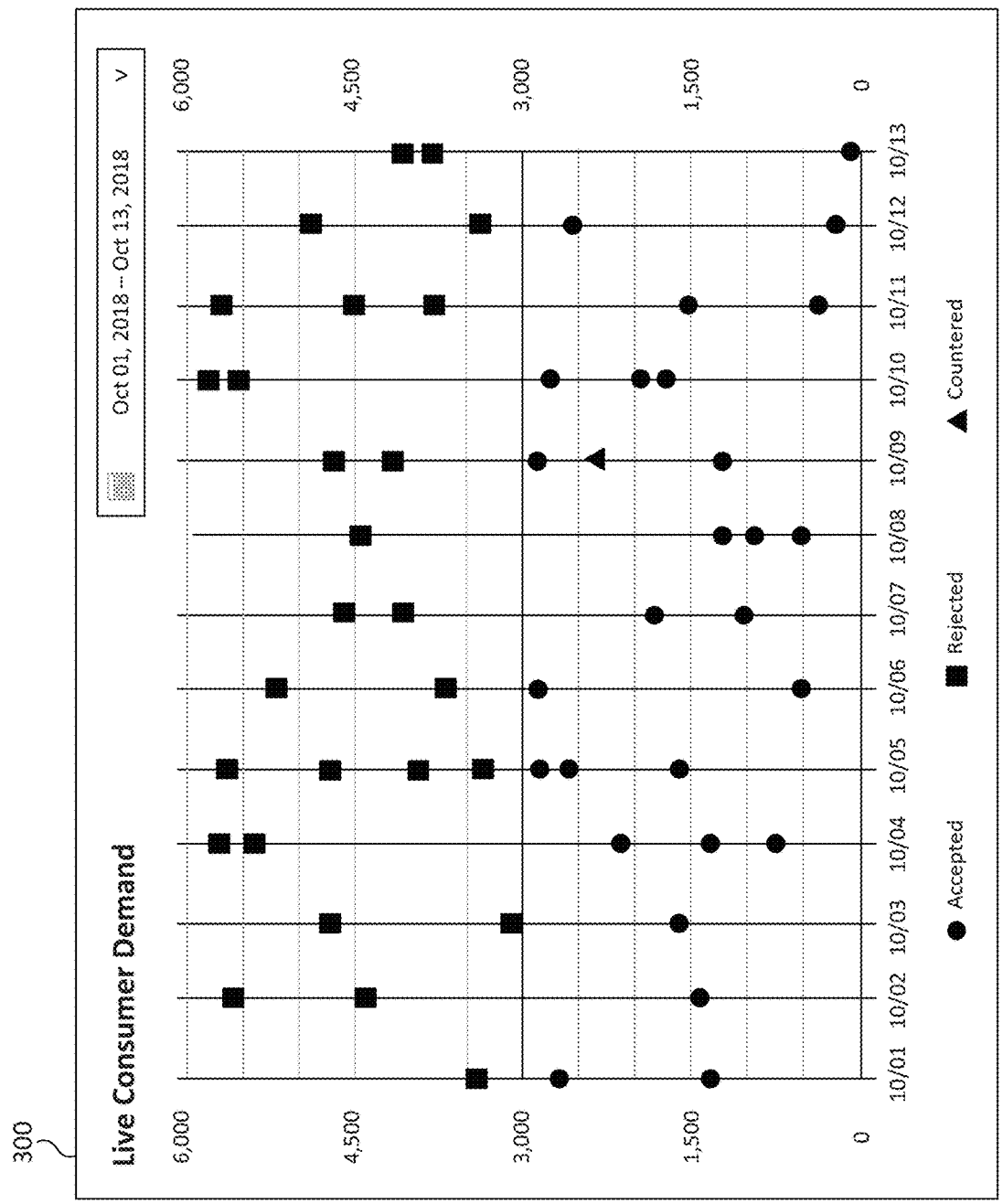
FIG. 3 illustrates an example visualization depicting consumer demand related to one or more campaigns, in accordance with one or more implementations.

FIG. 3 illustrates an example visualization 300 depicting consumer demand related to one or more campaigns, in accordance with one or more implementations. In various implementations, example visualization 300 may depict consumer demand based on the incentive cap for one or more campaigns. For example, example visualization 300 may depict consumer demand based on an incentive cap of $3,000. In various implementations, example visualization may include an indication of each request for an incentive amount received and an indication of whether the amount requested was accepted, rejected, and/or countered (i.e., a counteroffer was determined and provided to a consumer and/or their proxy). For example, example visualization 300 may depict each requested for an incentive amount received by system 100 plotted by value along a timeline. In some implementations, a user may select a time period (e.g., a given date or date range) and view live consumer demand for incentives during the selected time period. For example, a user may select a two-week time period from a drop-down list (e.g., Oct. 1, 2018-Oct. 13, 2018) and view consumer demand during that time period. In various implementations, a user may view consumer demand in real-time via example visualization 300. For example, example visualization 300 may be automatically updated based on information available to system 100 as described further herein.

Figure 4:
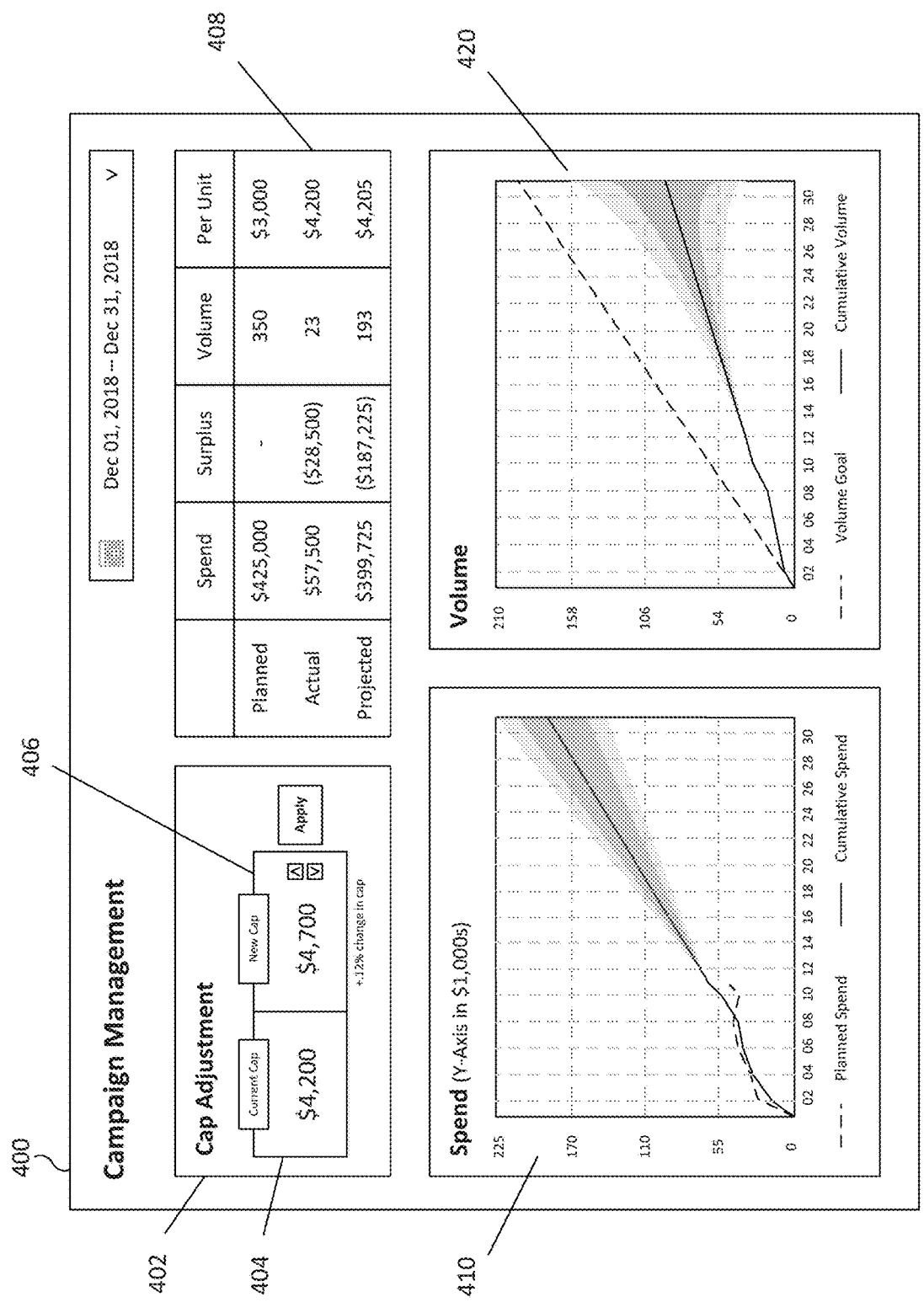
FIG. 4 illustrates an example interface for managing one or more campaigns and including multiple visualizations generated based on information available to the system, in accordance with one or more implementations.

FIG. 4 illustrates an example interface 400 for managing one or more campaigns and including multiple visualizations generated based on information available to the system 100, in accordance with one or more implementations. In various implementations, example interface 400 may comprise a campaign management interface through which an incentive provider may modify one or more campaign parameters and/or otherwise manage an ongoing campaign. For example, example interface 400 may comprise a campaign management interface through which an incentive provider may visualize the projected impact of modifications to one or more campaign parameters (e.g., an incentive cap) and modify the one or more campaign parameters via the interface. In various implementations, example interface 400 may comprise a campaign management interface through which an incentive provider may visualize the current incentive spend, the projected incentive spend, the current sale volume, the projected sale volume, and/or other statistics related to one or more campaigns and/or during a given time period. For example, example interface 400 may comprise a campaign management interface through which an incentive provider may visualize the current incentive spend, the projected incentive spend, the current sale volume, the projected sale volume, and/or other statistics related to one or more campaigns and/or during a given time period based on one or more proposed modifications to one or more campaign parameters.

In various implementations, example interface 400 may comprise parameter adjustment component 402, example visualization 410, example visualization 420, and/or one or more other components and/or visualizations. Parameter adjustment component 402 may be configured to display a current parameter and receive user input modifying the current parameter. For example, parameter adjustment component 402 may be configured to display a current parameter via parameter display 404 (e.g., a current incentive cap of $4,200) and receive user input modifying the current parameter via parameter input component 406. Via parameter input component 404, an incentive provider may input a new or modified parameter (e.g., a new incentive cap of $4,700). In response to the receipt of a new or modified parameter, campaign visualization component 120 may be configured to automatically update example visualization 410, example visualization 420, and/or one or more other visualizations based on the new or modified parameter. In various implementations, example interface 400 may be configured to modify the campaign parameter based on the user input received. For example, by selecting the selectable component labeled "Apply," an incentive provider may be able to effectuate a modification of a campaign parameter during the pendency of the campaign. Accordingly, system 100 may enable a user to visualize the projected impact of the addition and/or modification of a campaign parameter prior causing the campaign to be modified based on the addition and/or modification of the campaign parameter.

Campaign modification component 122 may be configured to modify a campaign. In various implementations, campaign modification component 122 may be configured to modify a campaign after the campaign has been initiated. For example, campaign modification component 122 may be configured to modify a campaign after a campaign has been initiated without causing any disruption to the campaign. In other words, campaign modification component 122 may be configured to dynamically make modifications to an ongoing campaign. For example, campaign modification component 122 may be configured to modify an incentive cap for a campaign after the campaign has been initiated in response to input received from an incentive provider modifying an incentive cap itself, the incentives available during a campaign, or a change in the one or more rules that govern whether those incentives are available to be provided to a consumer in conjunction with other incentives, and in what circumstances.

In various implementations, campaign modification component 122 may be configured to modify a campaign associated with an incentive provider in response to user input received from the incentive provider. In various implementations, campaign modification component 122 may be configured to receive requests from an incentive provider to modify a campaign. For example, campaign modification component 122 may be configured to obtain the requests from the incentive provider to modify the campaign from campaign management component 118. Requests to modify a campaign may include a request to modify a campaign parameter used to initiate and/or otherwise administrate a campaign. In various implementations, requests to modify the campaign may be received after the campaign has been initiated.

In various implementations, campaign modification component 122 may be configured to receive, from an incentive provider, a request to modify an incentive cap for a campaign after the campaign has been initiated. The incentive cap may define the maximum incentive amount that may be offered for any single item or set of items associated with a campaign. Responsive to receipt of the request to modify the incentive cap for the campaign, campaign modification component 122 may be configured to modify the incentive cap for the campaign. For example, campaign modification component 122 may be configured to modify the incentive cap for the campaign by modifying the campaign information (or campaign parameters) used to initiate and/or otherwise administrate the campaign.

In some implementations, campaign modification component 122 may be configured to modify an incentive cap for a campaign after the campaign has been initiated without receiving an explicit request to modify an incentive cap. For example, campaign modification component 122 may be configured to modify an incentive cap by automatically determining an updated incentive cap based on user input indicating a change in the one or more incentives available during a campaign or a change in the one or more rules that govern whether those incentives are available to be provided to a consumer in conjunction with other incentives, and in what circumstances.

In various implementations, campaign modification component 122 may be configured to determine one or more suggested modifications to a campaign and modify the campaign based on the one or more suggested modifications. For example, the campaign parameters used to initiate and/or otherwise administrate a campaign may include a campaign target parameter. The campaign target parameter may comprise an indication of a sales target or a volume goal for the campaign. The sales goal or volume goal may define the desired revenue or profit generated during and/or otherwise associated with the campaign, a desired number of the one or more items associated with the campaign sold during the campaign, and/or another indication of a target or goal for the campaign. Based on at least the campaign target parameter, campaign modification component 122 may be configured to identify one or more suggested modifications to the campaign (or at least one of the campaign parameters used to initiate and/or otherwise administrate the campaign). For example, the suggested modification may comprise a suggestion to move available funds for incentives associated with the campaign to another campaign, a suggestion to modify an expiration date associated with the campaign, a suggestion to modify the incentive cap for the campaign, and/or one or more other modifications to the campaign (or at least one of the campaign parameters).

In various implementations, campaign modification component 122 may be configured to determine an optimal incentive spend or incentive cap based on information available to the system. For example, campaign modification component 122 may be configured to determine the amount to increase or lower an incentive cap to in order to optimize the number of vehicles sold compared to the amount of money spent through incentives provided via system 100. In some implementations, campaign modification component 122 may be configured to determine amount to increase or lower an incentive cap to based on a demand curve indicating volume sold versus incentive amount spent.

In some implementations, campaign modification component 122 may be configured to identify suggested modifications to a campaign using an unsupervised goal-based machine learning algorithm. For example, campaign modification component 122 may be configured to identify a suggested modification to at least one campaign parameter (e.g., the incentive cap) using an unsupervised goal-based machine learning algorithm applied to at least a campaign target parameter and one or more of sale information, incentive request information, and/or other information associated with a campaign available to system 100. In various implementations, campaign modification component 122 may be configured to provide as input to a machine learning algorithm data associated with one or more campaigns and/or otherwise available to system 100 (e.g., information indicating requests for incentive amounts received, incentive spend over time, purchase transactions resulting from incentive spend, and/or other information available to system 100). In various implementations, campaign modification component 122 may be configured to receive as output from a machine learning algorithm an indication of one or more suggested modifications to a campaign and cause the one or more suggested modifications to be presented to one or more incentive providers.

In various implementations, campaign modification component 122 may be configured to provide one or more suggested modifications to a campaign to the incentive provider associated with the campaign. For example, campaign modification component 122 may be configured to generate a message to be provided to the inventive provider identifying the suggested modification to the campaign. In some implementations, the message identifying the suggested modification to the campaign may be provided to the incentive provider via a user interface displayed on a display of a client computing platform(s) 104.

In various implementations, campaign modification component 122 may be configured to provide one or more suggested modifications to a campaign to the incentive provider associated with the campaign via a workbench. For example, the workbench may comprise a user interface through which a user may modify one or more campaign parameters and/or otherwise manage an ongoing campaign. In various implementations, the workbench may be provided via an example interface the same as or similar to example interface 400 depicted and described with respect to FIG. 4.

In various implementations, campaign modification component 122 may be configured to modify a campaign (or at least one campaign parameter for the campaign) based on one or more suggested modifications to the campaign determined by campaign modification component 122. In some implementations, a message identifying the suggested modification to the campaign provided to the incentive provider may query the incentive provider to indicate whether to make the one or more suggested modifications. In some implementations, campaign modification component 122 may be configured to modify a campaign based on one or more suggested modifications in response to input received from the incentive provider comprising instructions to implement the one or more suggested modifications. In some implementations, campaign modification component 122 may be configured to automatically modify a campaign based on one or more suggested modifications. In other words, campaign modification component 122 may be configured to modify a campaign based on one or more suggested modifications without further input from the incentive provider. For example, campaign modification component 122 may be configured to automatically modify the incentive cap for a campaign based on a suggested modification to the incentive cap without further input from the incentive provider. This feature may or may not be enabled by the incentive provider. For example, an incentive provider may elect (e.g., via one or more computing platform(s) 104) to implement (or permit) the automatic modification of one or more campaign parameters based on suggested modifications determined by system 100. This or other elections by the incentive provider for a given campaign (e.g., an indication of whether the incentive provider has enabled automatic campaign parameter modifications and/or indication(s) of other elections by the incentive provider) may be defined by the one or more campaign parameters for the campaign.

Incentive provision component 124 may be configured to automatically determine whether to approve or deny a request for an incentive received from a consumer or their proxy. A consumer's proxy may comprise a representative of a retailer or other entity through which the one or more items associated with the request (and campaign) are to be purchased or to whom the consumer has indicated a desired incentive amount. In some implementations, incentive provision component 124 may be configured to determine a counter-offer to be provided to a consumer or their proxy in lieu of approving or denying the request. In various implementations, a request for an incentive may include an indication of a desired incentive amount, one or more items associated with the request, and/or other information associated with the request. For example, the other information associated with the request may include answers to additional questions posed to the consumer in connection with the request. In various implementations, incentive provision component 124 may be configured to receive, from a consumer or their proxy, a request for an incentive related to at least one of the one or more items associated with a campaign. For example, incentive provision component 124 may be configured to obtain a request for an incentive, from a consumer of their proxy, from campaign management component 118.

In various implementations, incentive provision component 124 may be configured to determine whether to approve or deny a request for a desired incentive amount based on one or more campaign parameters defining one or more aspects of the campaign at the time the request is received or assessed by incentive provision component 124. For example, incentive provision component 124 may be configured to receive a request for a desired incentive amount and determine whether to approve or deny the request based on the campaign parameters utilized to initiate the campaign and/or one or more campaign parameters that have been subsequently modified by campaign modification component 122. If a request for a desired incentive amount is received before one or more campaign parameters have been modified, incentive provision component 124 may be configured to determine whether to approve or deny the request based on the one or more unmodified campaign parameters (i.e., the one or more campaign parameters as they were at the time the campaign was initiated). If a request for a desired incentive amount is received after one or more campaign parameters have been modified, incentive provision component 124 may be configured to determine whether to approve or deny the request based on the modified one or more campaign parameters.

In an example implementation, incentive provision component 124 may be configured to receive, from a consumer or their proxy, a request for a desired incentive amount related to at least one of one or more items associated with a campaign after the incentive cap for the campaign has been modified. In the foregoing example implementation, incentive provision component 124 may be configured to determine whether to approve or deny the request based on the modified incentive cap. Responsive to receipt of the request, incentive provision component 124 may be configured to compare the desired incentive amount to the modified incentive cap. Responsive to a determination that the desired incentive amount does not exceed the modified incentive cap, incentive provision component 124 may be configured to automatically approve the request for the desired incentive amount. Responsive to a determination that the desired incentive amount does exceed the modified incentive cap, incentive provision component 124 may be configured to automatically deny the request for the desired incentive amount.

In various implementations, incentive provision component 124 may be configured to provide a notification to the consumer and/or their proxy indicating that a request for a desired incentive amount is approved or denied. For example, incentive provision component 124 may be configured to generate a message that includes an indication that the request for the desired incentive amount is approved or denied and cause the message to be provided to the consumer and/or their proxy via a user interface displayed on a display of a client computing platform(s) 104. In some implementations, incentive provision component 124 may be configured to provide the notification to the consumer and/or their proxy indicating that the request for the desired incentive amount is approved or denied without further input from the incentive provider.

In various implementations, incentive provision component 124 may be configured to determine a counter-offer to be provided to a consumer and/or their proxy in response to a determination that the request for the desired incentive amount is denied (e.g., because the desired incentive amount exceeds the incentive cap). For example, in the event the request for a desired incentive amount is denied, incentive provision component 124 may be configured to determine a counteroffer incentive amount up to or less than the (current) incentive cap. In various implementations, incentive provision component 124 may be configured to cause a notification indicating the counteroffer incentive amount to be provided to the consumer and/or their proxy. For example, the notification indicating the determined counteroffer incentive amount may be provided with and/or included within a notification (or message) indicating that the request for the desired incentive amount has been denied.

In some implementations, a request for a desired incentive amount that was previously denied may be reconsidered in response to one or more modifications to the campaign parameters. For example, incentive provision component 124 may be configured to reconsider a request for a desired incentive amount that was previously denied in response to the subsequent modification of the incentive cap. For example, responsive to the modification of an incentive cap for a campaign, incentive provision component 124 may be configured to determine whether the desired incentive amounts for previously denied requests no longer exceed the modified incentive cap based on the incentive request information stored.

In some implementations, incentive provision component 124 may be configured to determine whether to approve or deny a request for a desired incentive amount based on one or more additional factors. For example, incentive provision component 124 may be configured to determine whether to approve or deny a request for a desired incentive amount based further on an incentive budget associated with the campaign, an expiration date associated with the campaign, a sale volume cap and/or other constraints associated with the campaign (e.g., vehicle type, consumer agreements, deposit amount, retailer segment, geography, budget, and/or other constraints), an incentive surplus available to the user (e.g., the retailer or other entity through which the item is to be purchased), and/or other factors. In some implementations, incentive provision component 124 may be configured to determine whether to approve or deny a request for a desired incentive amount based on whether the incentive surplus for the user through which the item is to be purchased exceeds the amount the desired incentive amount is over the incentive cap. In some implementations, the additional factors considered by incentive provision component 124 when determining whether to accept or deny a request may be established based on the campaign parameters.

In various implementations, incentive provision component 124 may be configured to determine how to respond to requests for incentives based on one or more rules governing the provision of incentives available to consumers during a campaign. For example, incentive provision component 124 may be configured to determine whether to approve or deny a request for a desired incentive and/or how an incentive is to be provided to a consumer. In various implementations, system 100 may be configured to interface with multiple incentive providers (e.g., multiple entities, multiple incentive providers with a multi-level organization, and/or multiple multi-level organizations acting as separate incentive providers). In an example implementation in which system 100 interacts with or interfaces with multiple entities and/or a multi-level organization, the multiple entities and/or separate entities within the multi-level organization may each serve as an incentive provider. For example, in a multi-level organization, a dealer and an original equipment manufacturer may each act as incentive providers in that each may make incentives available to consumers through one or multiple campaigns via system 100.

In various implementations, the campaign parameters for a campaign may specify one or more incentives to be made available to consumer(s) during a campaign, the one or more incentive providers offering the incentive(s), and one or more rules governing the provision of the incentive(s) available to consumers during a campaign. In various implementations, different incentive providers may define one or more rules for the same or different incentives offered during the same campaign. For example, the one or more rules may specify that incentives from one incentive provider are only to be offered once all or a certain amount of available incentives from another incentive provider have been utilized or exhausted. In this way, system 100 may enable different incentive providers to ensure other incentive providers are not leveraging their incentives before utilizing their own. In some implementations, incentive providers may define campaign parameters comprising one or more rules indicating conditions that must be met for one or more incentives to be provided to consumer(s). For example, the conditions may indicate that an incentive provider will contribute up to a certain amount, the incentive provider will contribute the lesser of an amount specified by the incentive provider or an amount specified by another incentive provider, the incentive provider will provide the incentives defined by the campaign parameters only once the resources (e.g., an incentive budget) available from or offered by another incentive provider (e.g., an incentive provider beneath that incentive provider in a multi-level organization, such as a dealership if the incentive provider specifying the conditions is the original equipment manufacturer), and/or other conditions that specify the circumstances in which the incentive provider offers incentives during the campaign.

In various implementations, incentive providers may specify (e.g., by providing user input via a user interface specifying one or more campaign parameters as described herein) which incentives are available to be provided during a campaign and one or more rules that govern whether those incentives are available to be provided to a consumer in conjunction with other incentives and in what circumstances. In some implementations, system 100 may enable incentives providers to stack or otherwise combine mutually tolerant qualifying incentives through one or multiple campaigns. For example, a given incentive provider (e.g., a single entity or multi-level organization) may offer multiple incentives in a given campaign. In an example implementation, the incentive provider may, via system 100, offer up to a $1,000 incentive on a first product along with one or more additional incentives that may be provided to the consumer or their proxy (or applied to a given transaction) depending on one or more rules governing the provision of the additional incentives. For example, the one or more additional incentives may include a first additional incentive of $300 for the first product conditioned on whether the relevant transaction includes a retail trade and a second additional incentive of $300 that may be applicable to all products conditioned on whether the relevant transaction includes finance control. In this way, an incentive provider may incent different attributes of a single transaction.

In various implementations, incentive provision component 124 may be configured to automatically determine which of one or more incentives are available to a consumer during a campaign based on campaign parameters for that campaign (e.g., parameters indicating the one or more incentives available during a campaign and the one or more rules governing the incentives during that campaign) and automatically make incentives available to the consumer or their proxy based on the determination(s). For example, incentive provision component 124 may be configured to determine from which incentive provider one or more incentives are to be provided, determine which specific incentives the consumer qualifies for, and determine whether those incentives are to be made available to that consumer (e.g., based on a request received from the consumer or their proxy).

In the foregoing example, incentive provision component 124 may be configured to determine whether a consumer qualifies for the first additional incentive and/or the second additional incentive based on information provided directly from the consumer or their proxy (e.g., with a request for an incentive amount). Based on the determination regarding whether the consumer qualifies for the first additional incentive and/or the second additional incentive, incentive provision component 124 may be configured to make the first additional incentive and/or the second additional incentive available to the consumer in conjunction with the $1,000 incentive. As described herein, incentive provision component 124 may be configured to determine whether to approve or deny a request for a desired incentive amount. In some implementations, the determination of whether to approve or deny the request may be based on a single incentive amount available to the consumer (e.g., the incentive cap) or the collective incentive amount available based on multiple mutually tolerant qualifying incentives. Accordingly, in the foregoing example implementation, the consumer may be able to receive a single incentive amount, or multiple incentives, up to $1,000, $1,300, or $1,600 depending on which mutually tolerant incentives the consumer qualifies for.

In various implementations, computer readable instructions 114 may include one or more other computer program components that program the processor(s) 112 (and therefore system 100) to provide incentives to consumers to dynamically and/or interactively stimulate sales within a predetermined time period for individual consumers or groups of consumers. For example, computer readable instructions 114 may include one or more computer program components that program the processor(s) 112 (and therefore system 100) to provide incentives to consumers to dynamically and/or interactively stimulate sales within a predetermined time period for individual consumers or groups of consumers as described in U.S. patent application Ser. No. 12/710,022, entitled "SYSTEM AND METHOD FOR PROVIDING INCENTIVES TO PURCHASERS," filed Feb. 22, 2010 (and issued as U.S. Pat. No. 8,200,532 on Jun. 12, 2012), which is a continuation of U.S. patent application Ser. No. 09/735,446, entitled "SYSTEM AND METHOD FOR PROVIDING INCENTIVES TO PURCHASERS," filed Dec. 13, 2000 (and issued as U.S. Pat. No. 7,668,747 on Feb. 23, 2010), the disclosures of which are each hereby incorporated by reference in their entirety herein.

Electronic storage 130 may comprise non-transitory storage media that electronically stores information. The electronic storage media of electronic storage 130 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Although electronic storage 130 is shown in FIG. 1 as a single entity, this is for illustrative purposes only. In some implementations, electronic storage 130 may comprise multiple storage units. These storage units may be physically located within the same device, or electronic storage 130 may represent storage functionality of multiple devices operating in coordination.

Electronic storage 130 may store software algorithms, information determined by processor(s) 112, information received from server(s) 110, information received from one or more client computing platforms 104, information received from one or more external resources, and/or other information that enables server(s) 110 to function as described herein. In some implementations, one or more servers 102 and one or more other components of system 100 may be included within a single device configured to manage incentive campaigns and automatically approve requests for incentives received from consumers or their proxy based on dynamic parameters defined by an incentive provider. For example, one or more servers 102 and electronic storage 130 may be included within a single device.

Example Flowchart of Processes

Figure 5:
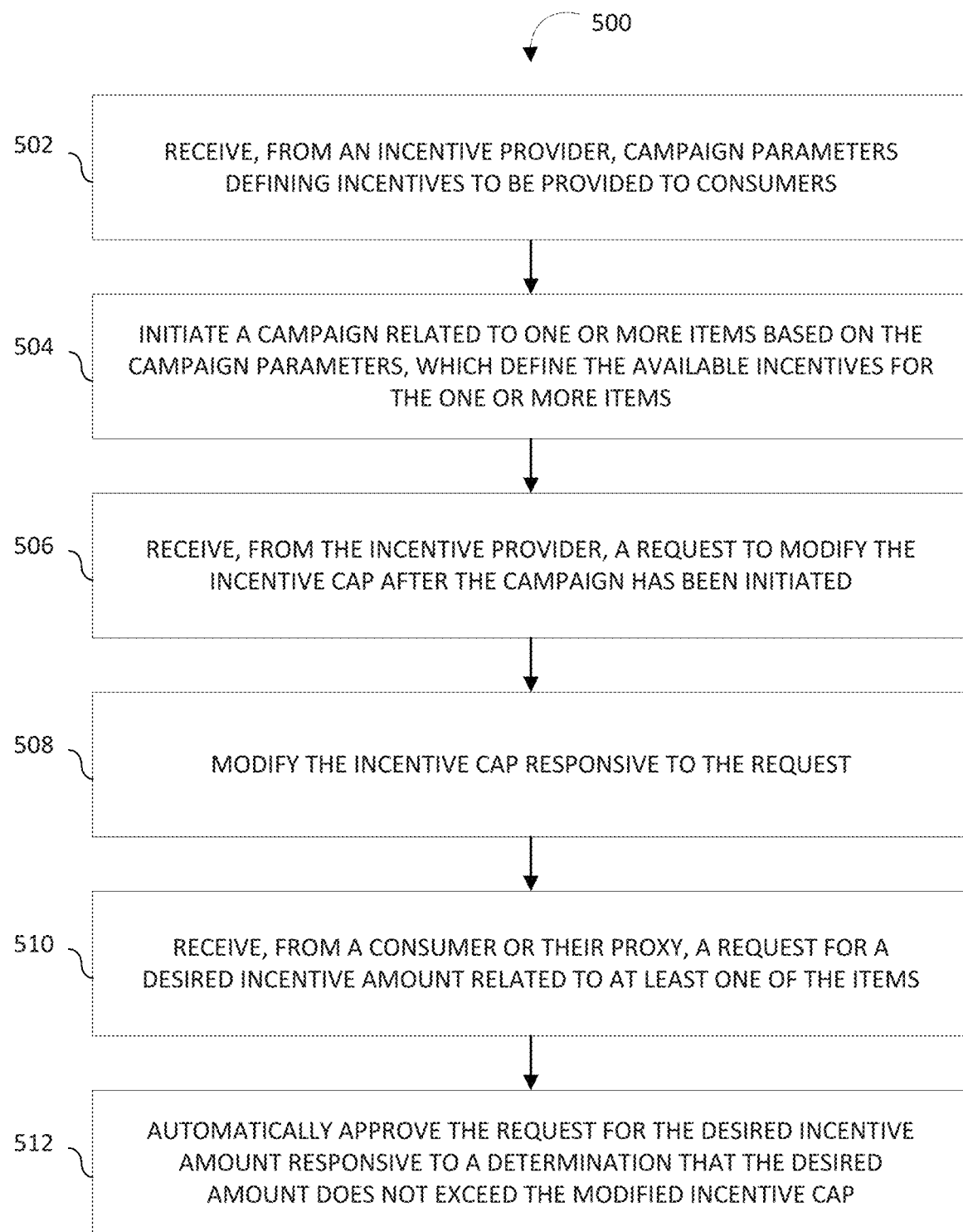
FIG. 5 illustrates an example of a process of managing incentive campaigns and automatically approving requests for incentives received from consumers or their proxy based on dynamic parameters defined by an incentive provider, according to an implementation of the invention.

FIG. 5 illustrates an example of a process 500 of managing incentive campaigns and automatically approving requests for incentives received from consumers or their proxy based on dynamic parameters defined by an incentive provider, according to an implementation of the invention. The operations of process 500 presented below are intended to be illustrative and, as such, should not be viewed as limiting. In some implementations, process 500 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 500 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 500 in response to instructions stored electronically on one or more electronic storage mediums. The one or more processing devices may include one or more devices configured through hardware, firmware, and/or software to be specifically designed for execution of one or more of the operations of process 500.

In an operation 502, process 500 may include receiving, from an incentive provider, campaign parameters defining incentives that may be made available to consumers during a campaign. For example, the campaign parameters may include at least an incentive cap. In various implementations, the incentive provider may comprise an original equipment manufacturer, another corporate entity, a retailer, and/or other users offering incentives through the system described herein (i.e., system 100). In some implementations, operation 502 may be performed by one or more processor components the same as or similar to campaign initiation component 116 (shown in FIG. 1 and described herein).

In an operation 504, process 500 may include initiating a campaign based on the campaign parameters. The campaign may be related to one or more items, and the campaign parameters may define the available incentives for the one or more items. In various implementations, the campaign parameters may further define an incentive budget associated with the campaign, an incentive cap defining the maximum amount for any given incentive, an expiration date associated with the campaign, a sale volume cap associated with the campaign, a campaign target parameter (i.e., a sales target, a volume goal, and/or other campaign target), and/or other aspects of the campaign. In various implementations, operation 504 may include providing one or more visualizations associated with the campaign. The visualizations may be automatically updated over time (e.g., during the pendency of the campaign). For example, an indication of a projected incentive spend for the campaign may be obtained. The current actual incentive spend may be determined during the campaign (e.g., based at least on one or more approved requests for incentives). In various implementations, a visualization may be generated and provided via a graphical user interface that depicts both the projected incentive spend and the actual incentive spend. In various implementations, an incentive provider may provide user input indicating potential changes to the incentive cap and the visualization may be updated to indicate the projected incentive spend based on the potential change to the incentive cap. As such, an incentive provider may visualize, in real-time, how changes to the incentive cap may affect the campaign itself. In some implementations, operation 504 may be performed by one or more processor components the same as or similar to campaign initiation component 116, campaign management component 118, and/or campaign visualization component 120 (shown in FIG. 1 and described herein).

In an operation 506, process 500 may include receiving, from the incentive provider, a request to modify the incentive cap after the campaign has been initiated. In some implementations, operation 506 may be performed by one or more processor components the same as or similar to campaign modification component 122 (shown in FIG. 1 and described herein).

In an operation 508, process 500 may include modifying the incentive cap responsive to the request. For example, the incentive cap may be modified based on the request. In various implementations, operation 508 may include modifying additional campaign parameters for a campaign after the campaign has been initiated. In some implementations, the campaign parameters for a campaign may include a campaign target parameter that indicates a sales target or volume goal for the campaign. Based on the stored incentive request information related to prior requests received and the sales target or volume goal, a suggested modification to the campaign (or at least one of the campaign parameters) may be determined. For example, the suggested modification may comprise a suggestion to move available funds for incentives associated with the campaign to another campaign, a suggestion to modify an expiration date associated with the campaign, a suggestion to modify the incentive cap for the campaign, and/or one or more other modifications to the campaign (or at least one of the campaign parameters). In some implementations, determining a suggested modification may include identifying the suggested modification using an unsupervised goal-based machine learning algorithm. For example, a suggested modification to the incentive cap may be identified using an unsupervised goal-based machine learning algorithm applied to at least the incentive request information and a campaign target parameter. In some implementations, the campaign (or at least one of the campaign parameters) may be automatically modified based on the suggested modification without further input from the incentive provider. For example, the incentive cap for a campaign may be automatically modified based on a suggested modification to the incentive cap without further input from the incentive provider. In some implementations, operation 508 may be performed by one or more processor components the same as or similar to campaign management component 118 and/or campaign modification component 122 (shown in FIG. 1 and described herein).

In an operation 510, process 500 may include receiving, from a consumer or their proxy, a request for a desired incentive amount related to at least one of the one or more items after the incentive cap has been modified. For example, the proxy may comprise a representative of a retailer through which the one or more items are to be purchased. For each request received, incentive request information associated with the request that includes an indication of the desired incentive amount requested and whether the given request was approved or denied may be stored. In the event a request for a desired incentive amount is received and automatically denied (as described below with respect to operation 512), the incentive request information may be reconsidered responsive to the later modification of the incentive cap. For example, responsive to the modification of an incentive cap for a campaign, whether the desired incentive amounts for previously denied requests no longer exceed the modified incentive cap may be determined based on the incentive request information, as described below with respect to operation 512. In some implementations, operation 510 may be performed by one or more processor components the same as or similar to campaign management component 118 and/or incentive provision component 124 (shown in FIG. 1 and described herein).

In an operation 512, process 500 may include automatically approving the request for the desired incentive amount responsive to a determination that the desired amount does not exceed the modified incentive cap. In various implementations, operation 512 may include determining whether the desired incentive amount exceeds the modified incentive cap. Responsive to a determination that the desired incentive amount does not exceed the modified incentive cap, the request for the desired incentive amount may be automatically approved. Responsive to a determination that the desired incentive amount does exceed the modified incentive cap, the request for the desired incentive amount may be automatically denied. In various implementations, a notification may be provided to the consumer or their proxy indicating that the request for the desired incentive amount is approved or denied without further input from the incentive provider. For example, operation 512 may include generating a message to be provided to a consumer responsive to a determination that a desired incentive amount does not exceed the modified incentive cap and causing the message to be transmitted to the consumer. In the event the request for the desired incentive amount is denied, a counteroffer incentive amount up to or less than the modified incentive cap may be determined and a notification indicating the determined counteroffer incentive amount may be provided to the consumer or their proxy. For example, the notification indicating the determined counteroffer incentive amount may be provided with a notification that the request for the desired incentive amount has been denied. In some implementations, the request for the desired incentive amount may be approved or denied based on one or more additional factors. For example, the request for the desired incentive amount may be approved or denied based further on an incentive budget associated with the campaign, an expiration date associated with the campaign, a sale volume cap associated with the campaign, and/or other factors. In some implementations, the additional factors may be established based on the campaign parameters. In some implementations, operation 512 may be performed by one or more processor components the same as or similar to incentive provision component 124 (shown in FIG. 1 and described herein).

The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

For purposes of explanation, numerous specific details are set forth in order to provide a thorough understanding of the description. It will be appreciated by those having skill in the art that the implementations described herein may be practiced without these specific details or with an equivalent arrangement. Accordingly, it is to be understood that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

The various instructions described herein are exemplary only. Other configurations and numbers of instructions may be used, so long as the processor(s) are programmed to perform the functions described herein. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the computer-readable instructions.

Although processor(s) 112 are illustrated in FIG. 1 as a single component, this is for illustrative purposes only. In some implementations, processor(s) 112 may comprise multiple processing units. These processing units may be physically located within the same device, or processor(s) 112 may represent processing functionality of multiple devices operating in coordination. In some implementations, one or more processors 112 may be implemented by a cloud of computing platforms operating together as one or more processors 112. Processor(s) 112 be configured to execute one or more components by software; hardware; firmware; some combination of software, hardware, and/or firmware; and/or other mechanisms for configuring processing capabilities on processor(s) 112. As used herein, the term "component" may refer to any component or set of components that perform the functionality attributed to the component. This may include one or more physical processors during execution of processor readable instructions, the processor readable instructions, circuitry, hardware, storage media, or any other components. Furthermore, it should be appreciated that although the various instructions are illustrated in FIG. 1 as being co-located within a single processing unit, in implementations in which processor(s) 112 include multiple processing units, one or more instructions may be executed remotely from the other instructions.

The various instructions described herein may be stored in a storage device, which may comprise random access memory (RAM), read only memory (ROM), and/or other memory. For example, electronic storage 130 may comprise any tangible computer readable storage medium, including random access memory, read only memory, magnetic disk storage media, optical storage media, flash memory devices, and/or other memory configured to computer-program instructions. In various implementations, electronic storage 130 may be configured to store the computer program instructions (e.g., the aforementioned instructions) to be executed by the processors as well as data that may be manipulated by the processors.

One or more databases may be stored in one or more storage devices of system 100 (e.g., electronic storage 130). The databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

In some instances, well-known structures and devices are shown in block diagram form in order to avoid unnecessarily obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to manage incentive campaigns and automatically approve requests for incentives received from consumers or their proxy based on parameters defined by an incentive provider, the system comprising:
one or more physical processors; and
a storage device configured to store one or more computer program instructions that, when executed by the one or more physical processors, configure the computer system to:
(a) receive, from an incentive provider, campaign parameters defining incentives that may be made available for one or more possible transactions, wherein the campaign parameters include at least a campaign target parameter, the campaign target parameter comprising an indication of at least one of a sales target, volume goal, or other campaign target;
(b) initiate a campaign based on the campaign parameters, wherein the campaign relates to the one or more possible transactions and the campaign parameters define available incentives for the one or more possible transactions;

(c) electronically store incentive request information comprising, for each of a plurality of individual incentive requests received, an indication of a desired incentive amount requested and whether the incentive request was approved;

(d) automatically determine, after the campaign has been initiated, one or more suggested modifications to the campaign parameters by applying a machine learning algorithm to the stored incentive request information and the campaign target parameter, wherein the one or more suggested modifications to the campaign parameters are determined to optimize at least one of a number or amount of incentives granted during the campaign;

(e) cause a message to be provided to the incentive provider via a user interface, the message comprising at least an indication of the one or more suggested modifications to the campaign parameters;

(f) receive, from the incentive provider, a request to modify one or more campaign parameters after the campaign has been initiated based on the one or more suggested modifications;

(g) modify the one or more campaign parameters responsive to the request to modify the one or more campaign parameters;

(h) receive, from a consumer or their proxy, a request for a desired incentive amount related to at least one of the one or more possible transactions after the one or more campaign parameters have been modified;

(i) determine whether the desired incentive amount requested by the consumer or their proxy satisfies one or more rules associated with the one or more campaign parameters;

(j) automatically approve the request for the desired incentive amount responsive to a determination that the desired incentive amount requested by the consumer or their proxy satisfies the one or more rules;

(k) update the stored incentive request information by electronically storing an indication of the desired incentive amount requested by the customer or their proxy and whether the received request from the customer or their proxy was approved; and (l) automatically determine a second one or more suggested modifications to the campaign parameters by applying the machine learning algorithm to the updated stored incentive request information and the campaign target parameter, wherein the second one or more suggested modifications to the campaign parameters are determined to optimize an amount of incentives granted during the campaign, based on a determined amount of available surplus, after the stored incentive request information has been updated based on the received request from the consumer or their proxy.

2. The system of claim 1, wherein the incentive provider comprises an original equipment manufacturer, and wherein the consumer or their proxy comprises a representative of a retailer through which one or more items are to be purchased.

3. The system of claim 1, wherein to automatically approve the request for the desired incentive amount, the computer system is configured to:
cause a notification to be provided to at least one of the consumer and their proxy indicating that at least a portion of the request for the desired incentive amount is approved without further input from the incentive provider.

4. The system of claim 1, wherein the request is automatically approved based further on an incentive budget associated with the campaign and/or an expiration date associated with the campaign.

5. The system of claim 1, wherein the one or more modified campaign parameters include a modified incentive cap, and responsive to a determination that the desired incentive amount exceeds the modified incentive cap, the computer system is further configured to:
automatically deny the request for the desired incentive amount.

6. The system of claim 1, wherein responsive to a determination that the desired incentive amount does not satisfy the one or more rules associated with the one or more campaign parameters, the computer system is further configured to:
determine a counteroffer incentive amount, wherein the counteroffer incentive amount is less than the desired incentive amount; and
cause a notification to be provided to at least one of the consumer and their proxy indicating at least the determined counteroffer incentive amount.

7. The system of claim 1, wherein the computer system is further configured to:
obtain an indication of a projected incentive spend for the campaign;
determine an actual incentive spend based at least on one or more approved requests for incentives, the one or more approved requests for incentives including at least the approved request for the desired incentive amount; and
generate a visualization to be provided via a graphical user interface, the visualization including an indication of the projected incentive spend and the actual incentive spend.

8. The system of claim 1, wherein the machine learning algorithm comprises an unsupervised goal-based machine learning algorithm, and the computer system is configured to:
identify the one or more suggested modifications to the campaign parameters using the unsupervised goal-based machine learning algorithm applied to at least the incentive request information and the campaign target parameter.

9. The system of claim 1, wherein the computer system is further configured to:
automatically modify at least one campaign parameter based on the one or more suggested modifications without further input from the incentive provider.

10. The system of claim 1, wherein the one or more suggested modifications include a suggestion to move available funds for incentives associated with the campaign to another campaign.

11. The system of claim 1, wherein the one or more suggested modifications include a suggestion to modify an expiration date associated with the campaign.

12. The system of claim 1, wherein the computer system is further configured to:
receive, from a first consumer or their proxy other than the consumer, a first request for a first desired incentive amount related to at least one of the one or more possible transactions;
automatically deny the first request for the first desired incentive amount responsive to a determination that the first desired incentive amount exceeds an incentive cap;

responsive to the modification of the one or more campaign parameters, determine whether the first desired incentive amount exceeds a modified incentive cap;
generate a second message, the second message comprising a notification to be provided to the first consumer responsive to a determination that the first desired incentive amount does not exceed the modified incentive cap; and
transmit the second message to the first consumer.

13. A computer-implemented method of managing incentive campaigns and automatically approving requests for incentives received from consumers or their proxy based on parameters defined by an incentive provider, the method being implemented on a computer system having one or more physical processors and a storage device configured to store one or more computer program instructions that, when executed by the one or more physical processors, configure the computer system to perform the method, the method comprising:

(a) receiving, by the computer system from an incentive provider, campaign parameters defining incentives that may be made available for one or more possible transactions, wherein the campaign parameters include at least a campaign target parameter, the campaign target parameter comprising an indication of at least one of a sales target, volume goal, or other campaign target;

(b) initiating, by the computer system, a campaign based on the campaign parameters, wherein the campaign relates to the one or more possible transactions and the campaign parameters define available incentives for the one or more possible transactions;

(c) electronically storing, by the computer system, incentive request information comprising, for each of a plurality of individual incentive requests received, an indication of a desired incentive amount requested and whether the incentive request was approved;

(d) automatically determining, by the computer system, after the campaign has been initiated, one or more suggested modifications to the campaign parameters by applying a machine learning algorithm to the stored incentive request information and the campaign target parameter, wherein the one or more suggested modifications to the campaign parameters are determined to optimize at least one of a number or amount of incentives granted during the campaign;

(e) causing, by the computer system, a message to be provided to the incentive provider via a user interface, the message comprising at least an indication of the one or more suggested modifications to the campaign parameters;

(f) receiving, by the computer system from the incentive provider, a request to modify one or more campaign parameters after the campaign has been initiated based on the one or more suggested modifications;

(g) modifying, by the computer system, the one or more campaign parameters responsive to the request to modify the one or more campaign parameters;

(h) receiving, by the computer system from a consumer or their proxy, a request for a desired incentive amount related to at least one of the one or more possible transactions after the one or more campaign parameters have been modified;

(i) determining, by the computer system, whether the desired incentive amount requested by the consumer or their proxy satisfies one or more rules associated with the one or more campaign parameters;

(j) automatically approving, by the computer system, the request for the desired incentive amount responsive to a determination that the desired incentive amount requested by the consumer or their proxy satisfies the one or more rules;

(k) updating, by the computer system, the stored incentive request information by electronically storing an indication of the desired incentive amount requested by the customer or their proxy and whether the received request from the customer or their proxy was approved; and (l) automatically determining, by the computer system, a second one or more suggested modifications to the campaign parameters by applying the machine learning algorithm to the updated stored incentive request information and the campaign target parameter, wherein the second one or more suggested modifications to the campaign parameters are determined to optimize an amount of incentives granted during the campaign, based on a determined amount of available surplus, after the stored incentive request information has been updated based on the received request from the consumer or their proxy.

14. The method of claim 13, wherein the incentive provider comprises an original equipment manufacturer, and wherein the consumer or their proxy comprises a representative of a retailer through which one or more items are to be purchased.

15. The method of claim 13, wherein automatically approving the request for the desired incentive amount comprises:
causing, by the computer system, a notification to be provided to at least one of the consumer and their proxy indicating that at least a portion of the request for the desired incentive amount is approved without further input from the incentive provider.

16. The method of claim 13, wherein the request is automatically approved based further on an incentive budget associated with the campaign and/or an expiration date associated with the campaign.

17. The method of claim 13, wherein the one or more modified campaign parameters include a modified incentive cap, and responsive to a determination that the desired incentive amount exceeds the modified incentive cap, the method further comprises:
automatically denying, by the computer system, the request for the desired incentive amount.

18. The method of claim 13, wherein responsive to a determination that the desired incentive amount does not satisfy the one or more rules associated with the one or more campaign parameters, the method further comprises:
determining, by the computer system, a counteroffer incentive amount, wherein the counteroffer incentive amount is less than the desired incentive amount; and
causing, by the computer system, a notification to be provided to at least one of the consumer and their proxy indicating at least the determined counteroffer incentive amount.

19. The method of claim 13, the method further comprising:
obtaining, by the computer system, an indication of a projected incentive spend for the campaign;
determining, by the computer system, an actual incentive spend based at least on one or more approved requests for incentives, the one or more approved requests for incentives including at least the approved request for the desired incentive amount; and generating, by the computer system, a visualization provided via a graphical user interface, the visualization including an indication of the projected incentive spend and the actual incentive spend.

20. The method of claim 13, wherein the machine learning algorithm comprises an unsupervised goal-based machine learning algorithm, and the method further comprises:
identifying, by the computer system, the one or more suggested modifications to the campaign parameters using the unsupervised goal-based machine learning algorithm applied to at least the incentive request information and the campaign target parameter.

21. The method of claim 13, the method further comprising:
automatically modifying, by the computer system, at least one campaign parameter based on the one or more suggested modifications without further input from the incentive provider.

22. The method of claim 13, wherein the one or more suggested modifications include a suggestion to move available funds for incentives associated with the campaign to another campaign.

23. The method of claim 13, wherein the one or more suggested modifications include a suggestion to modify an expiration date associated with the campaign.

24. The method of claim 13, the method further comprising:
receiving, by the computer system from a first consumer or their proxy other than the consumer, a first request for a first desired incentive amount related to at least one of the one or more possible transactions;
automatically denying, by the computer system, the first request for the first desired incentive amount responsive to a determination that the first desired incentive amount exceeds an incentive cap;
responsive to modifying the one or more campaign parameters, determining, by the computer system, whether the first desired incentive amount exceeds a modified incentive cap;
generating, by the computer system, a second message, the second message comprising a notification to be provided to the first consumer responsive to a determination that the first desired incentive amount does not exceed the modified incentive cap; and
transmitting, by the computer system, the second message to the first consumer.

25. The system of claim 1, wherein the computer system is further configured to:
generate a visualization of a projected impact of the one or more suggested modifications to the campaign parameters, the visualization including an indication of a projected incentive spend based on an incentive cap specified by the campaign parameters and an indication of a projected incentive spend based on a suggested modification to the incentive cap, wherein the message is provided to the incentive provider via a graphical user interface with the visualization of the projected impact of the one or more suggested modifications.

26. The method of claim 13, the method further comprising:
generating, by the computer system, a visualization of a projected impact of the one or more suggested modifications to the campaign parameters, the visualization including an indication of a projected incentive spend based on an incentive cap specified by the campaign parameters and an indication of a projected incentive spend based on a suggested modification to the incentive cap, wherein the message is provided to the incentive provider via a graphical user interface with the visualization of the projected impact of the one or more suggested modifications.

27. The system of claim 1, wherein the request for a desired incentive amount received from the consumer or their proxy includes information from the consumer or their proxy responsive to one or more questions from the incentive provider.

28. The system of claim 27, wherein the computer system is further configured to determine whether the consumer qualifies for one or more specific incentives during the campaign based on the information from the consumer or their proxy responsive to the one or more questions from the incentive provider.

29. The method of claim 13, wherein the request for a desired incentive amount received from the consumer or their proxy further includes information from the consumer or their proxy responsive to one or more questions from the incentive provider.

30. The method of claim 29, further comprising determining whether the consumer qualifies for one or more specific incentives during the campaign based on the information from the consumer or their proxy responsive to the one or more questions from the incentive provider.

* * * * *